United States Patent
Kerkar et al.

(10) Patent No.: US 6,231,665 B1
(45) Date of Patent: May 15, 2001

(54) EFFLORESCENCE CONTROL IN CEMENTITIOUS COMPOSITIONS AND MASONRY UNITS

(75) Inventors: Awdhoot V. Kerkar, Chelmsford; Vikram Kumar, Medford, both of MA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/401,640

(22) Filed: Sep. 22, 1999

(51) Int. Cl.$^7$ .................................................. C04B 24/24
(52) U.S. Cl. ........................ 106/810; 106/728; 106/823
(58) Field of Search ................................ 106/810, 823, 106/728

(56) References Cited

U.S. PATENT DOCUMENTS

| | | |
|---|---|---|
| 4,434,193 | 2/1984 | Beckenhauer ................ 427/299 |
| 4,999,218 * | 3/1991 | Rehmer et al. ................ 427/519 |
| 5,037,873 | 8/1991 | Heaton .......................... 524/267 |
| 5,336,727 | 8/1994 | Okazawa et al. ............. 525/327.8 |
| 5,460,648 | 10/1995 | Walloch et al. ............... 106/215 |
| 5,556,460 | 9/1996 | Berke et al. ................... 106/823 |
| 5,681,385 | 10/1997 | Beckenhauer ................ 106/724 |
| 5,919,300 | 7/1999 | Burge et al. ................... 106/727 |

FOREIGN PATENT DOCUMENTS

| | | |
|---|---|---|
| 171109 | 3/1997 | (PL) . |
| WO95/04008 | 2/1995 | (WO) . |

OTHER PUBLICATIONS

Journal of the American Oil Chemists' Society, "The Binding of Free Calcium Ions In Aqueous Solution Using Chelating Agents, Phosphates and Poly(Acrylic Acid)", vol. 60, No. 3, Mar. 1983, pp. 618–622.

Journal of the American Oil Chemists' Society, "Surfactants & Detergents", vol. 61, No. 9, Sep. 1984, pp. 1475–1478.

Journal of Paint Technology, "Studies on the Mechanisms And Control of Efflorescence Through Paint Films", vol. 41, No. 538, Nov. 1969, pp. 615–622.

\* cited by examiner

*Primary Examiner*—Anthony Green
(74) *Attorney, Agent, or Firm*—Craig K. Leon; William L. Baker

(57) ABSTRACT

A cementitious composition is disclosed whereby visible efflorescence is prevented when formed into a cement masonry concrete unit. Efflorescence is controlled by incorporation of a polymer comprising a polyacrylic acid or salt or derivative thereof having an average molecular weight in the range of 5004–9,000, and more preferably in the average molecular weight range of 1,000 to 10,000.

18 Claims, No Drawings

EFFLORESCENCE CONTROL IN CEMENTITIOUS COMPOSITIONS AND MASONRY UNITS

FIELD OF THE INVENTION

The present invention relates to admixtures for cementitious compositions and masonry units, and in particular a method for preventing visible efflorescence in cement masonry units, and cement and masonry cement compositions comprising a polyacrylic acid based polymer.

BACKGROUND OF THE INVENTION

Masonry units, sometimes referred to as concrete masonry units (CMUs), include segmental retaining wall (SRW) units, pavers, and architectural blocks, all of which are made from a "masonry concrete," which is comprised of hydratable cement binder and a fine aggregate. As used herein and hereinafter, the term "fine aggregate" means and refers to aggregate (e.g., non-cementitious) particles wherein at least 95% of said particles have an average diameter of less than 0.375 inches (0.95 cm.). Masonry concrete lacks the coarse aggregate (typically greater than 0.5 inch diameter) that is further used in conventional concrete, such as, for example, ready-mix concrete.

More significantly, masonry concrete differs from conventional concrete because it is said to have zero "slump," or, to phrase it more accurately, a practically immeasurable fluidity. The slump property is determined by placing wet masonry concrete into an inverted cone, and then removing the cone, and measuring the distance (if any) by which the cone-molded sample drops in height. See ASTM C143 (1988) ("Standard Test Method for Slump of Portland Cement Concrete"). Typically, the slump of masonry concrete is 0–0.75 inches, and thus masonry concrete is said to have essentially "zero slump."

The phenomenon of efflorescence is manifested as an undesirable whitish coloration or deposit on the surface of cement masonry units such as blocks, pavers, retaining wall segments, and other structures made of low-slump, cementitious mixtures. Efflorescence is a primary problem where the masonry units are used for aesthetic applications.

Currently available chemicals used for efflorescence control include the use of stearates (e.g., zinc stearate dispersions, calcium stearate dispersions) and tall oil fatty acid (TOFA), which, the inventors believe, hinders or blocks the water-borne movement of soluble salts such as calcium hydroxide to the surface of the masonry unit, thereby blocking one of the mechanisms by which efflorescence occurs.

SUMMARY OF THE INVENTION

One of the purposes of the present invention is to reduce the visual appearance of calcium carbonate deposits on the surface of the cement or masonry units.

The present inventors have discovered that this may be done using a polymer comprising a polyacrylic acid or salt or derivative thereof, which polymer has a molecular weight of 500–49,000, more preferably 1,000–19,000, and, most preferably, 1,000–10,000.

An exemplary composition of the invention comprises a hydratable cementitious binder (preferably in the amount of 5–25% based on total dry weight of the composition), a fine aggregate portion in the amount of 75 to 95% based on total dry weight of solids in the composition. When water is incorporated to wet the composition, the composition is preferably a masonry concrete having essentially zero slump when tested by the standard cone method for measuring slump (See e.g., ASTM C143 (1988) ("Standard Test Method for Slump of Portland Cement Concrete"); the composition further comprising a polymer comprising polyacrylic acid or salt or derivative thereof and having an average molecular weight in the range of 500–49,000, and most preferably in the range of 1000–10,000. Preferably, the polymer will comprise an alkali or alkaline earth metal salt (e.g., sodium polyacrylate).

Exemplary methods of the invention for preventing efflorescence in a hydratable cementitious composition involve combining a polymer comprising a polyacrylic acid or salt or derivative thereof, the polymer having an average molecular weight range between 500–49,000, with a hydratable cementitious binder.

Still further exemplary methods are directed to preventing efflorescence particularly in masonry concrete units, and this may be done by combining the above-described polymer with cement during the manufacture (e.g., grinding) of the cement or incorporation of the polymer into a masonry concrete composition, preferably as an aqueous solution, or combination of the polymer with one or more components during formulation of the masonry concrete composition.

Further features and advantages of the invention are provided hereinafter.

DETAILED DESCRIPTION OF EXEMPLARY EMBODIMENTS

The term "masonry concrete" as used herein shall mean and refer to a cementitious composition containing a Portland cement 5–25% (s/s total dry weight composition) and 75–95% (s/s total dry weight composition) of a "fine aggregate" (ASTM 136 (1996)). The term "fine aggregate", as used herein and hereinafter, means and refers to aggregate (e.g., non-cementitious) particles wherein at least 95% of the particles have an average diameter of less than 0.375 inches (0.95 cm.). Masonry concrete lacks the coarse aggregate (typically greater than 0.5 inch diameter) that is further used in conventional concrete, such as, for example, ready-mix concrete.

The term "cement masonry unit" as may be used herein refers to a structure, such as a block, paver, retaining wall segment, or other three-dimensional structure made from a hydratable cementitious mixture, such as pipes or architectural blocks.

The term "cementitious composition" is used to refer to mixtures composed of a hydratable cement or cementitious binder (usually, but not exclusively, Portland cement, masonry cement, or mortar cement and may also include limestone, hydrated lime, fly ash, blast furnace slag, and silica fume or other materials commonly included in such cements) to which water is added to introduce hydration. Such cementitious mixtures include "mortars" which are pastes containing a cement binder and also a fine aggregate (as defined above). The cementitious mixtures used for forming masonry units have a much lower slump (i.e., lower fluidity) than ready-mix concretes. The manufacture of masonry units typically involves molding cementitious structures so that they are free-standing and susceptible to subsequent curing by self-generated or external heat treatment.

Cementitious compositions of the invention may be formed by mixing required amounts of certain materials, e.g., a hydratable cementitious binder, water, and fine aggregate (as defined above), with a polyacrylic acid or salt or derivative thereof, the polymer having an average molecular weight of 500–49,000; more preferably 1,000–19,000; and most preferably, having an average molecular weight of 1,000–10,000.

Another exemplary method of the invention comprises providing a masonry concrete, comprised of a cement binder and fine aggregate (and having less than 2% by weight of coarse aggregate, which is defined as stones having an average diameter of one-half inch), and a zero slump (e.g., slump of 0–0.75 when tested by the standard cone method), and incorporating into said concrete a polymer comprising a polyacrylic acid or salt or derivative thereof, said polymer having an average molecular weight in the range of 500–49,000. The amount of the polymer is preferably 0.01–5.0 percent based on total dry weight of cementitious binder, and more preferably this amount is 0.05–1.0 percent based on total dry weight of cementitious binder.

A low molecular weight polyacrylic acid-based polymer suitable for use in the invention is commercially available from BASF (Badische Aniline & Sodafabrik, Ludwigshafen of Germany) under the tradename SOKALAN® CP-10. This is a modified sodium acrylate polymer having an average molecular weight of about 4,000. This is a dispersing agent that has been tested previously as a dispersive admixture to make flowable concrete, but the present inventors believe that until the present invention, the use of low molecular weight polyacrylic acid polymers have not been used for preventing efflorescence in cementitious compositions generally, and particularly not been known or suggested for use in masonry cementitious compositions or concrete masonry units in which essentially zero slump is a defining characteristic.

In connection with masonry concrete and concrete masonry units, which involve essentially zero slump concrete, the present inventors believe that it is particularly surprising and novel to incorporate a low molecular weight polyacrylic based polymer (such as modified sodium polyacrylate sold under the tradename SOKALAN® CP-10) because the prior known function of SOKOLAN® CP-10 polyacrylic acid as a dispersant would be antithetical to the purposes of the present invention.

Exemplary masonry compositions of the invention comprise a cementitious binder and a polyacrylic acid or salt or derivative thereof, the polymer having an average molecular weight in the range of 500–49,000 (more preferably in the range of 500–19,000; and most preferably in the range of 1,000–10,000). Preferably, the masonry composition includes a hydratable cement binder comprising 5–25% based on total dry weight of the composition, and a fine aggregate portion comprising 75 to 95% based on total dry weight of solids in the composition. Preferably, the composition has no or substantially no coarse aggregates, although masonry concrete may contain some coarse aggregates but usually no more than 2% by total dry weight of the composition. The masonry concrete composition, when wet, has an essentially zero slump when tested by the standard cone method for measuring slump, as described above.

Another exemplary cementitious composition of the invention, in addition to incorporating the above-described low molecular weight polyacrylic acid based polymer, further comprises a fatty acid (preferably a calcium stearate dispersion) and/or a latex. The fatty acid and/or latex are believed to provide further benefits in terms of efflorescence control and/or a latex. Other fatty acids which may be used for further efflorescence control include butyl oleate, zinc stearate, tall oil fatty acid, and others. Generally, it is believed that $C_8$–$C_{18}$ fatty acids and their salts may be appropriately used in exemplary embodiments of the present invention as an additional efflorescence control agent. This also includes such fatty acids optionally in combination with latexes. The fatty acids may be employed in the amount of 0.01–5.0% s/s (based on cement) and more preferably 0.5–1.0% s/s (cement).

Exemplary latexes which are believed to be suitable for providing further benefits to decreasing visible efflorescence include, but are not limited to, polycarboxylic acids (e.g., acrylic, maleic), styrene-butadiene, polyurethanes, butyl rubber, natural rubber, and others. The amount of latex may be employed in the invention in the amount of 0.01–5.0% s/s (based on cement) and more preferably 0.5–1.0% s/s (cement).

As previously mentioned, exemplary methods of the invention for preventing efflorescence (in structures made from hydratable cementitious compositions) involve introducing the low molecular weight polymer polyacrylic acid or salt or derivative thereof to a hydratable cementitious binder. This may be done during the manufacture (e.g., grinding of the cement) or during the formulation of a hydratable cementitious composition, such as by combining the polymer with one or more components of the composition (e.g., binder, fine aggregate, or with the addition water) or directly into a hydratable cementitious mixture.

A preferred mode for incorporating the polyacrylic acid into the cement composition is in the form of an aqueous solution (e.g., sodium polyacrylate) with the addition water.

The foregoing examples are provided for illustration only and are not intended to limit the scope of the invention.

EXAMPLE 1

Three masonry concrete samples were made using Portland cement (10.7% based on total dry weight), sand as a fine aggregate (89.3%), and water/cementitious binder ratio of 0.3. The first sample (#1) was a control. Sample #2 contained a sodium salt of copolymer of acrylic acid and maleic acid (average molecular weight 70,000) in the amount of 0.75% based on total dry weight of cementitious binder. This copolymer is available from BASF under the tradename SOKOLAN® "CP-5." Sample #3 contained a modified sodium polyacrylate polymer (average molecular weight 4,000) available from BASF under the tradename SOKOLAN® "CP-10" in the amount of 0.67% based on total dry weight of cementitious binder. Concrete masonry blocks were cast using the three sample compositions and allowed to harden for a day in a closed container. The following day the cured units were split and 5 ml of water was poured down the middle of the split surface of the blocks. The blocks were then allowed to dry overnight. The following day it was observed that the wetted portion of the split face of samples #1 (control) and #2 both manifested visible efflorescence (whitish haze). However, sample #3 containing the low molecular weight polyacrylic acid based polymer showed no visible efflorescence on its surface. This test demonstrated that the prevention of efflorescence is not an inherent property of polyacrylic acid type polymers, and that the selection of low molecular weight polyacrylic acid type polymers of the present invention are indeed inventive.

The foregoing description and example are intended for illustrative purposes only and not for limiting the scope of the invention.

What is claimed is:

1. A cementitious composition comprising a hydratable cementitious binder comprising Portland cement in the amount of 5–25% based on total dry weight of the composition; said composition further comprising a fine aggregate portion comprising 75 to 95% based on total dry weight of solids in the composition, said fine aggregate comprising non-cementitious particles wherein at least 95% of the particles have an average diameter of less than 0.375 inches; the composition, when wet, having essentially zero slump when tested by the standard cone method for measuring slump; said composition further comprising an alkali or alkaline earth metal polyacrylic acid or polyacrylate or derivative thereof and having an average molecular weight in the range of 500–49,000, said polymer being present in the amount of 0.01–5.0% based on dry weight of said cementitious binder present in the composition.

2. The composition of claim 1 wherein said composition is formed into a concrete masonry unit.

3. The composition of claim 2 wherein said concrete masonry unit is shaped into a a brick, a paver, a segmental retaining wall, a pipe, or an architectural block.

4. The composition of claim 1 wherein said polyacrylic acid or polyacrylate or derivative thereof has an average molecular weight in the range of 1,000–10,000.

5. The composition of claim 1 wherein said polyacrylic acid or polyacrylate or derivative thereof comprises a sodium polyacrylate having an average molecular weight of 4000.

6. The composition of claim 1 further comprising a $C_8$–$C_{18}$ fatty acid or salt or derivative thereof in the amount of 0.01–5.0% based on cement in the composition.

7. The composition of claim 1 wherein said polyacrylic acid or polacrylate or derivative thereof is present in the composition in the amount of 0.1–1.0 percent based on dry weight of said cementitious binder.

8. A method for preventing efflorescence in a cementitious composition comprising providing a hydratable cementitious binder comprising Portland cement in the amount of 5–25% based on total dry weight of the composition; said composition further comprising a fine aggregate portion comprising 75 to 95% based on total dry weight of solids in the composition, said fine aggregate comprising non-cementitious particles wherein at least 95% of the particles have an average diameter of less than 0.375 inches; the composition, when wet, having essentially zero slump when tested by the standard cone method for measuring slump; said composition further comprising an alkali or alkaline earth metal polyacrylic acid or salt or derivative thereof in the amount of 0.01–5.0% based on dry weight of said cementitious binder and having an average molecular weight in the range of 500–49,000.

9. The method of claim 8 further comprising forming said composition into a concrete masonry unit.

10. The method of claim 9 wherein said masonry unit is formed into a brick, a paver, a segmental retaining wall, a pipe, or an architectural block.

11. The method of claim 8 wherein said polyacrylic acid or salt or derivative thereof has an average molecular weight in the range of 1,000–10,000.

12. The method of claim 8 wherein said salt comprises a sodium polyacrylate having an average molecular weight of 4000.

13. The method of claim 8 comprising combining said polyacrylic acid or salt or derivative thereof with said cementitious binder before combining with said fine aggregate.

14. The method of claim 13 wherein said polyacrylic acid or salt or derivative thereof is introduced to said cementitious binder during the manufacture of said cementitious binder.

15. The method of claim 8 comprising combining said polyacrylic acid or salt or derivative thereof with said fine aggregate before combining with said cementitious binder.

16. The method of claim 8 comprising introducing said polyacrylic acid or salt or derivative thereof as an aqueous solution to components of said composition.

17. The method of claim 8 further comprising adding a $C_8$–$C_{18}$ fatty acid or its salt in the amount of 0.01–5.0% based on cement in the composition.

18. The method of claim 8 further comprising adding a latex in the amount of 0.5–1.0% based on cement in the composition, said latex comprising a polymer selected from the group consisting of polycarboxylic acid, styrene-butadiene, polyurethane, butyl rubber, and natural rubber.

* * * * *